United States Patent Office 3,048,563
Patented Aug. 7, 1962

3,048,563
COMPOSITION COMPRISING RUBBER AND 2,6-DI-TERTIARY-BUTYL-3-METHYLPHENOL
Robert Seydel, Koln-Dellbruck, Theo Kempermann, Koln-Lindenthal, Willi Hahn, Koln-Stammheim, and Rüdolf Stroh, Leverkusen-Bayerwerk, Germany, assignors to Farbenfabriken Bayer Aktiengesellschaft, Leverkusen, Germany, a corporation of Germany
No Drawing. Filed May 5, 1959, Ser. No. 810,994
Claims priority, application Germany May 13, 1958
1 Claim. (Cl. 260—45.95)

This invention relates to novel antioxidants for vulcanizable polymers.

It is known that phenols which are substituted in the 2-, 4- and 6-positions by hydrocarbon radicals can be used as antioxidants.

It is an object of the instant invention to provide novel antioxidants. Another object is to provide very effective antioxidants which have no discoloring effect in the vulcanisates. Further objects will appear hereinafter.

It has now been found that phenols which are only substituted in the two o-positions to the hydroxy group by hydrocarbon radicals, such as for example alkyl, aryl cycloalkyl or aralkyl radicals, and which can, if desired, contain a methyl radical in an m-position, the sum of the carbon atoms of the o- and m-substituents being altogether at least 9, are very suitable as antioxidants.

Examples of the compounds suitable for the process of the invention are given below:

2-methyl-6-tert.-octylphenol
2-methyl-6-nonylphenol
2-methyl-6-(1,1-dimethylbenzyl)-phenol
2-ethyl-6-($\alpha$-methylcyclohexyl)-phenol
2-isopropyl-6-cyclohexylphenol
2-methyl-6-dodecylphenol
2-methyl-6-(1-phenylethyl)-phenol
2-sec.-butyl-6-cyclohexyl-phenol
2-tert.-butyl-6-cyclohexyl-phenol
2-tert.-butyl-6-($\alpha$-methylcyclohexyl)-phenol
3-methyl-2,6-di-tert.-butylphenol
3-methyl-2,6-dicyclohexylphenol
3-methyl-2-(1-phenylethyl)-6-dodecyl-phenol Particularly suitable are those phenols in which the hydrocarbon radicals in the o-position and perhaps the m-position contain a total of up to approximately 21 carbon atoms.

The compounds used according to the invention can be obtained by processes known per se from the phenols which are already substituted by hydrocarbon radicals in an o- or m-position, by reacting them with suitable olefins, such as for example isobutylene, n-butylene, cyclohexene, methyl cyclohexene, nonylene, styrene, diisobutylene or dodecylene, in the presence of catalysts, such as for example aluminum phenolate.

The antioxidants are suitable as anti-oxidizing agents for vulcanizable elastomers such as natural rubber and synthetic rubber-like elastomers, such as for example butadiene/styrene copolymers, chlorobutadiene polymers or butadiene/acrylonitrile copolymers. The compounds can be added to the raw mixtures but also to the rubber latices, for example in the form of a dispersion. They can be added in the usual proportions, for example 0.1 to 5% by weight, advantageously 0.5 to 2% by weight, based on the rubber content, and if it is desired, mixtures thereof with other known antioxidants can also be used. However, depending on the efficacy of the phenol and the desired degree of stabilization, smaller or larger amounts may be necessary. The antioxidants produce in the rubber a pronounced resistance to oxidation. They also prevent the development of the so-called crazing phenomenon when the rubber is exposed to the influence of weather, that is to say the formation of a network system or irregularly orientated fine cracks on the surface of the vulcanizate. The compounds used according to the invention generally have no discoloring effect when the vulcanizates manufactured therewith are exposed to light, and produce no contact discoloration in adjoining materials, for example lacquer, enamel, textiles.

The following examples further illustrate the invention without limiting it thereto.

EXAMPLE 1

The following mixture based on natural rubber is made on a rubber mill:

|  | Parts by weight |
|---|---|
| Pale crepe | 100.0 |
| Zinc oxide | 10.0 |
| Stearic acid | 1.0 |
| Tetramethyl thiuram-monosulfide | 0.5 |
| Titanium dioxide | 10.0 |
| Blanc fixe | 60.0 |
| Sulfur | 2.0 |
| Antioxidant as indicated in Table 1. | |

The mixture is then vulcanized in a press for 20 minutes at 2.0 atm. gauge (133° C.). The products obtained have the following mechanical values.

Table 1
(a) WITHOUT ANTIOXIDANT

| | Tensile strength, kg./cm.$^2$ | Elongation, percent | Modulus at 450% elongation, kg./cm.$^2$ | Resilience 20° C./ 75° C., percent | Shore hardness, degrees |
|---|---|---|---|---|---|
| Prior to ageing | 210 | 645 | 90 | 69/74 | 51 |
| Ageing in the oxygen bomb (according to Bierer Davis) 21 atm. oxygen at 70° C.: | | | | | |
| After 6 days | 142 | 535 | 103 | 62/66 | 50 |
| After 11 days | 22 | 160 | | 22/22 | 41 |
| After 16 days | | Destroyed | | | |

NOTE.—Crazing: After weathering for 2 months—Strong.

(b) WITH 1% OF 2,6-DI-TERT.-BUTYL-4-METHYL PHENOL (FOR COMPARISON PURPOSES)

| | Tensile strength, kg./cm.$^2$ | Elongation, percent | Modulus at 450% elongation, kg./cm.$^2$ | Resilience 20° C./ 75° C., percent | Shore hardness, degrees |
|---|---|---|---|---|---|
| Prior to ageing | 212 | 640 | 87 | 70/74 | 50 |
| Ageing in the oxygen bomb (according to Bierer Davis) 21 atm. oxygen at 70° C.: | | | | | |
| After 6 days | 130 | 520 | 101 | 63/67 | 50 |
| After 11 days | 80 | 460 | 81 | 56/66 | 49 |
| After 16 days | 54 | 410 | | 50/59 | 49 |

NOTE.—Crazing: After weathering for 2 months—None.

(c) WITH 1% of 2-SEC.-BUTYL-6-CYCLOHEXYL-PHENOL

| | Tensile strength, kg./cm.² | Elongation, percent | Modulus at 450% elongation, kg./cm.² | Resilience 20° C./ 75° C., percent | Shore hardness, degrees |
|---|---|---|---|---|---|
| Prior to ageing | 204 | 665 | 83 | 71/74 | 50 |
| Ageing in the oxygen bomb (according to Bierer Davis) 21 atm. oxygen at 70° C.: | | | | | |
| After 6 days | 168 | 540 | 111 | 67/73 | 54 |
| After 11 days | 137 | 525 | 96 | 63/67 | 51 |
| After 16 days | 114 | 500 | 89 | 60/66 | 50 |

NOTE.—Crazing: After weathering for 2 months (Jan.-Feb.)—None.

The 2-sec.-butyl-6-cyclohexyl phenol can be prepared in the following manner:

250 parts by weight of o-cyclohexyl-phenol are heated with 3 parts by weight of aluminum powder and 0.1 part by weight of mercury chloride for 1 hour at 200° C. in an autoclave provided with a stirrer, the aluminum dissolving with evolution of hydrogen. 90 parts by weight of butylene are then pumped in and the mixture stirred for another 8 hours at 200° C., the initial pressure falls from 40 to 21 atmospheres. The reaction product is distilled by fractionation in vacuo with addition of 50 parts by volume of water. 260 parts by weight of 2-sec.-butyl-6-cyclohexyl-phenol (diphenoquinone, M.P. 212° C.) distil over at 171–172° C. at 10 mm. Hg together with a small quantity of initial phenol and 4-sec.-butyl-6-cyclohexyl-phenol (B.P.$_{10}$ 186–187° C.).

(d) WITH 1% OF 2-METHYL-6-(1-ETHYL-PHENYL)-PHENOL

| | Tensile strength, kg./cm.² | Elongation, percent | Modulus at 450% elongation, kg./cm.² | Resilience 20° C./ 75° C., percent | Shore hardness, degrees |
|---|---|---|---|---|---|
| Prior to ageing | 202 | 740 | 53 | 68/70 | 46 |
| Ageing in the oxygen bomb (according to Bierer Davis) 21 atm. oxygen at 70° C.: | | | | | |
| After 6 days | 142 | 575 | 78 | 64/69 | 47 |
| After 11 days | 120 | 580 | 66 | 60/63 | 46 |
| After 16 days | 101 | 575 | 58 | 52/56 | 40 |

NOTE.—Crazing: After weathering for 2 months (Sept.-Oct.)—None.

The 2-methyl-6-(1-ethyl-phenyl)-phenol can be prepared in the following manner:

250 parts by weight of o-cresol are heated together with 2 parts by weight of aluminum powder for 1 hour at 200° C. in a pressure-type vessel. 208 parts by weight of styrene are then pumped in and the mixture stirred for another 24 hours at 150° C. The reaction product is worked up by fractional distillation in vacuo with addition of 50 parts by volume of water. About 200 parts by weight of 2-methyl-6-(1-ethyl-phenyl)-phenol distil over as main fraction at 165° C. 10 mm. Hg (phenyl urethane, M.P. 74° C.) together with a small quantity of initial cresol and 2-methyl-4-(1-phenyl-ethyl)-phenol.

(e) WITH 1% OF 2,6-DI-TERT.-BUTYL-3-METHYLPHENOL

| | Tensile strength, kg./cm.² | Elongation, percent | Modulus at 450% elongation, kg./cm.² | Resilience 20° C./ 75° C., percent | Shore hardness, degrees |
|---|---|---|---|---|---|
| Prior to ageing | 214 | 675 | 80 | 70/74 | 50 |
| Ageing in the oxygen bomb (according to Bierer Davis) 21 atm. oxygen at 70° C.: | | | | | |
| After 6 days | 152 | 535 | 104 | 67/70 | 52 |
| After 11 days | 126 | 515 | 90 | 61/68 | 50 |
| After 16 days | 93 | 490 | 89 | 56/62 | 48 |

NOTE.—Crazing: After weathering for 2 months (Jan.-Feb.)—None.

The 2,6-di-tert.-butyl-3-methylphenol can be prepared in the following manner:

400 parts by weight of m-cresol are heated together with 5 parts by weight of activated aluminum powder in a pressure vessel for 1 hour at 180° C. the corresponding quantity of aluminum-m-cresolate being formed. After cooling to 90 C., 435 parts by weight of isobutylene are pumped in and the mixture stirred for 10 hours at 92–95° C. the initial pressure falling gradually from 13 to 1.5 atm. The catalyst is removed from the alkylation mixture by being stirred out with dilute sulfuric acid. By subsequent fractional distillation in vacuo, 665 parts by weight of 2,6-di-tert.-butyl-3-methylphenol are obtained as main fraction (B.P.$_{10}$ 143–147° C.), which solidifies to form a crystal cake. By recrystallization from petroleum ether the substance is obtained in pure form with a M.P. 63–64° C. (phenyl urethane, M.P. 172° C.).

(f) WITH 1% OF 2-TERT.-BUTYL-6-CYCLOHEXYL-PHENOL

| | Tensile strength, kg./cm.² | Elongation, percent | Modulus at 450% elongation, kg./cm.² | Resilience 20° C./ 75° C., percent | Shore hardness, degrees |
|---|---|---|---|---|---|
| Prior to ageing | 214 | 670 | 75 | 71/71 | 49 |
| Ageing in the oxygen bomb (according to Bierer Davis) 21 atm. oxygen at 70° C.: | | | | | |
| After 6 days | 150 | 550 | 94 | 66/68 | 50 |
| After 11 days | 127 | 525 | 87 | 63/68 | 50 |
| After 16 days | 93 | 470 | 85 | 53/63 | 49 |

NOTE.—Crazing: After weathering for 2 months (Jan.-Feb.)—None.

The 2-tert.-butyl-6-cyclohexyl-phenol can be prepared in the following manner:

176 parts by weight of o-cyclohexyl-phenol are heated with 2 parts by weight of aluminum powder and 0.1 part by weight of mercury chloride at 180° C. until the aluminum has dissolved with evolution of hydrogen (about 1 hour). The reaction product is stirred in a stirrer-type autoclave for 3 hours at 130° C. after adding 57 parts by weight of isobutylene. The liquid alkylation mixture is stirred with dilute sulfuric acid to remove the catalyst and is fractionally distilled in vacuo. As well as some unmodified o-cyclohexyl-phenol and a little of the p-isomer, there is obtained a good yield of 2-tert.-butyl-6-cyclohexyl-phenol as an oil boiling at 170° C./10 mm. Hg (phenyl urethane, M.P. 192–194° C.).

(g) WITH 1% OF 2-METHYL-6-TERT.-OCTYL-PHENOL

| | Tensile strength, kg./cm.² | Elongation, percent | Modulus at 450% elongation, kg./cm.² | Resilience 20° C./ 75° C., percent | Shore hardness, degrees |
|---|---|---|---|---|---|
| Prior to ageing | 210 | 665 | 82 | 71/74 | 50 |
| Ageing in the oxygen bomb (according to Bierer Davis) 21 atm. oxygen at 70° C.: | | | | | |
| After 6 days | 145 | 505 | 115 | 67/73 | 54 |
| After 11 days | 126 | 515 | 96 | 62/69 | 50 |
| After 16 days | 104 | 500 | 84 | 57/64 | 48 |

NOTE.—Crazing: After weathering for 2 months (Jan.-Feb.)—None.

The 2-methyl-6-tert.-octyl-phenol can be prepared in the following manner:

108 parts by weight of o-cresol are heated in an autoclave provided with a stirrer, with 2 parts by weight of aluminum powder and 0.1 part by weight of mercury chloride for 1 hour at 190° C., the aluminum dissolving. After adding 165 parts by weight of diisobutylene, the mixture is stirred at 100–120° C. After the reaction is completed, the catalyst is removed with dilute sulfuric acid and the organic layer is distilled in vacuo. As well as some unreacted starting materials, 2-methyl-4-tert.-octyl-phenol (B.P.$_{20}$ 167° C.) and 2-methyl-6-tert.-octyl-phenol (B.P.$_{20}$ 153° C., M.P. 67–69° C.) are obtained with good yields.

We claim:

As a new composition of matter rubber containing as antioxidant 2,6-di-tert.-butyl-3-methylphenol.

References Cited in the file of this patent

UNITED STATES PATENTS

| | | |
|---|---|---|
| 2,470,447 | Van Gilder | May 17, 1949 |
| 2,565,998 | Swaney et al. | Aug. 28, 1951 |
| 2,626,954 | Albert | Jan. 27, 1953 |
| 2,670,340 | Kehe | Feb. 23, 1954 |
| 2,801,980 | Spacht | Aug. 6, 1957 |
| 2,836,577 | Kolka et al. | May 27, 1958 |